United States Patent [19]

Whetten

[11] 4,376,893

[45] Mar. 15, 1983

[54] ION CHAMBER ARRAY WITH REDUCED DEAD SPACE

[75] Inventor: Nathan R. Whetten, Burnt Hills, N.Y.

[73] Assignee: General Electric Company, Schenectady, N.Y.

[21] Appl. No.: 907,117

[22] Filed: May 18, 1978

Related U.S. Application Data

[63] Continuation of Ser. No. 676,282, Apr. 12, 1976, abandoned.

[51] Int. Cl.³ .............................................. G01T 1/18
[52] U.S. Cl. ..................................... 250/374; 250/385
[58] Field of Search ...................... 250/374, 385, 363; 313/93

[56] References Cited

U.S. PATENT DOCUMENTS

| | | | |
|---|---|---|---|
| 2,649,554 | 8/1953 | Anton | 313/93 |
| 3,296,478 | 1/1967 | Ichinokawa | 313/93 |
| 3,418,474 | 12/1968 | Spergel et al. | 313/93 |
| 3,509,339 | 4/1970 | Doehner | 250/363 |
| 3,930,162 | 12/1975 | Reiss | 250/385 |

FOREIGN PATENT DOCUMENTS 39-2449  3/1964  Japan.

Primary Examiner—Alfred E. Smith
Assistant Examiner—Janice A. Howell
Attorney, Agent, or Firm—Marvin Snyder; James C. Davis, Jr.

[57] ABSTRACT

An ionization chamber for use in determining the spatial distribution of x-ray photons in computerized tomography systems comprises a plurality of substantially parallel, planar anodes separated by parallel, planar cathodes and enclosed in a gas of high atomic weight at a pressure from approximately 10 atmospheres to approximately 50 atmospheres. X-ray radiation enters the chamber through a thin conductive window disposed substantially perpendicular to the anodes and cathodes. A dielectric layer disposed on the inner surface of the window accumulates charge during x-ray irradiation to modify the electric field in the region between the anodes, cathodes, and window so as to permit the collection of electrons and ions produced by interactions in that region.

In a preferred embodiment, a conductive electrode is placed on the inner surface of the dielectric layer and maintained at anode potential to modify and stabilize the electric field behind the window and thus stabilize the detector characteristics.

9 Claims, 4 Drawing Figures

ION CHAMBER ARRAY WITH REDUCED DEAD SPACE

This is a continuation of application Ser. No. 676,282, filed Apr. 12, 1976, now abandoned.

BACKGROUND OF THE INVENTION

This invention concerns ion chamber type X-ray detector arrays. More specifically, this invention relates to structures for increasing the probability of detection of X-ray photons which interact with a detector gas in a region between ion chamber electrodes and a grounded input window.

A copending patent application by Nathan R. Whetten and John M. Houston, Ser. No. 616,930, filed Sept. 26, 1975, now U.S. Pat. No. 4,031,396 and assigned to the assignee of this invention describes an array of ionization chamber type X-ray detectors for use in determining the spatial distribution of X-ray photons in computerized tomography systems. The array comprises a plurality of substantially parallel, planar anodes separated by parallel, planar cathodes and enclosed in a gas of high atomic weight at a pressure in the range from approximately 10 atmospheres to approximately 50 atmospheres. X-ray photons interact with the gas to produce photoelectron-ion pairs. In the presence of an electric field, the electrons thus produced are collected on the anodes and the ions on the cathodes to produce electric currents in proportion to the X-ray intensity in the vicinity of those electrodes.

The anodes, cathodes and detector gas of such ion chamber arrays are typically enclosed in a metal pressure vessel having at least one thinned wall or window which is relatively transparent to X-ray photons. In a preferred embodiment of that ion chamber array, the window comprises a thin aluminum sheet disposed perpendicular to and spaced from approximately 0.5 millimeter to approximately 1.5 millimeters away from the collector electrodes (i.e., cathode and anode).

The electric fields in those, prior art ion chamber arrays are such that the electron-ion pairs produced in the space between the collector electrodes and the window fail to reach the detector plates and thus, do not contribute to the electrical output signal. In an array filled with xenon gas at a pressure in the range from approximately 20 atmospheres to approximately 30 atmospheres as much as five or ten percent of 60 kev X-rays passing through the window are absorbed in this "dead space"; a factor which significantly lowers the quantum detection efficiency and noise equivalent absorption of the array. The X-ray dose which must be administered to a patient undergoing examination in a system incorporating this detector is, therefore, substantially increased by the presence of the "dead space".

SUMMARY OF THE INVENTION

A layer of dielectric material is disposed on the inner surface of the window of an ion chamber array. The electric field in the region between the window and the collecting electrodes is thereby modified to increase the probability of collection of ion-electron pairs produced in that region. In a preferred embodiment of the invention, a thin conductive layer is disposed on the surface of the dielectric opposite the window and is maintained at anode potential.

The present invention makes it possible to collect substantially all of the electrons and ions produced by those X-rays that are absorbed in the "dead space" between the window and the collector plates. The active absorption length of the ion chamber array is, thus, correspondingly lengthened.

It is, therefore, an object of this invention to increase the quantum detection efficiency and noise equivalent absorption of ion chamber-type X-ray detector arrays.

Another object of this invention is to reduce the radiation dose administered to patients undergoing tomographic X-ray examination.

BRIEF DESCRIPTION OF THE DRAWINGS

The novel features believed characteristic of the present invention are set forth in the appended claims. The invention itself, together with further objects and advantages thereof, may best be understood with reference to the following detailed description taken in connection with the appended drawings in which:

DESCRIPTION OF THE PREFERRED EMBODIMENTS

X-ray photons will interact with atoms of a heavy gas to produce electron-ion pairs. The X-ray photons are, generally, absorbed or Compton scattered by a gas atom which emits a photoelectron from one of its electronic levels. The photoelectrons move through the gas interacting with and ionizing other gas atoms to produce a shower of electrons and positive ions which may be collected on suitable electrodes to produce an electric current flow. If these electron-ion pairs are produced in a region between two electrodes of opposite polarity, they will drift along electric field lines to the electrodes and yield a net electric current flow between them. The electric current flow between electrodes is thus a function of the total number of X-ray photons interacting in the vicinity of those electrodes.

Figure 1:
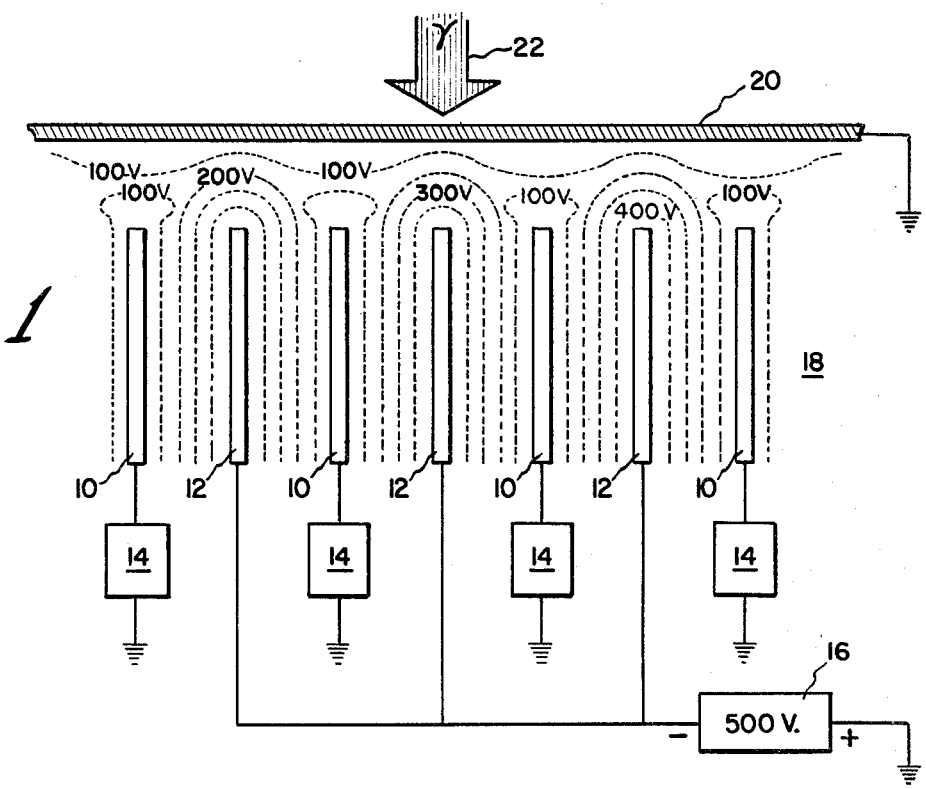
FIG. 1 is an ion chamber, X-ray detector array of the prior art.

FIG. 1 is a portion of an embodiment of a multicell X-ray detector which is more particularly described in the above-referenced disclosure of Nathan R. Whetten and John M. Houston, which disclosure is incorporated by reference as background material herein. An array of parallel, planar anodes 10 and cathodes 12 are disposed in an atmosphere of high pressure xenon gas 18 within a containment vessel (not shown). The cathodes 12 are maintained at negative electric potential by a voltage source 16 having a grounded positive terminal. The anodes 10 are maintained near ground potential and are connected through current detector circuits 14 which produce electrical signals in proportion to the current flow from the anodes.

Although the collection electrodes in the embodiments of detector arrays described herein will, for the sake of convenience of description, be described as cathodes and anodes; it will be appreciated by those skilled in the art that the polarity of the voltage source 16 may be reversed and that similar signals may be obtained by detecting current flow from the cathode elements.

An X-ray beam 22, which typically varies in intensity along the length of the detector array, impinges on the detector gas 18 in a direction substantially parallel to the anode plates 10 and cathode plates 12. The beam enters the region occupied by the detector gas 18 by passing through a thin window 20 which is relatively transparent to X-ray radiation. The term "relatively transparent" as used herein means that the probability of X-ray absorption in the window structure is substantially less than the probability of X-ray interaction in the detector gas 18. In a preferred embodiment of the detectors of the present invention, the window typically comprises a sheet of aluminum having a thickness in the range from approximately 3 millimeters to approximately 6 millimeters which forms a part of and is electrically connected to a pressure containment vessel which is electrically grounded.

The dotted lines in FIG. 1 indicate equipotential contours in the regions between the anodes 10, the cathodes 12 and the grounded window 20. The field distribution in the region between the collection plates 10 and 12 and the window 20 is generally directed toward the window so that electrons produced by X-ray interactions in this region will tend to flow to the window rather than to the anodes 10 and will not contribute to the current measured by the detector circuits 14.

Figure 2:
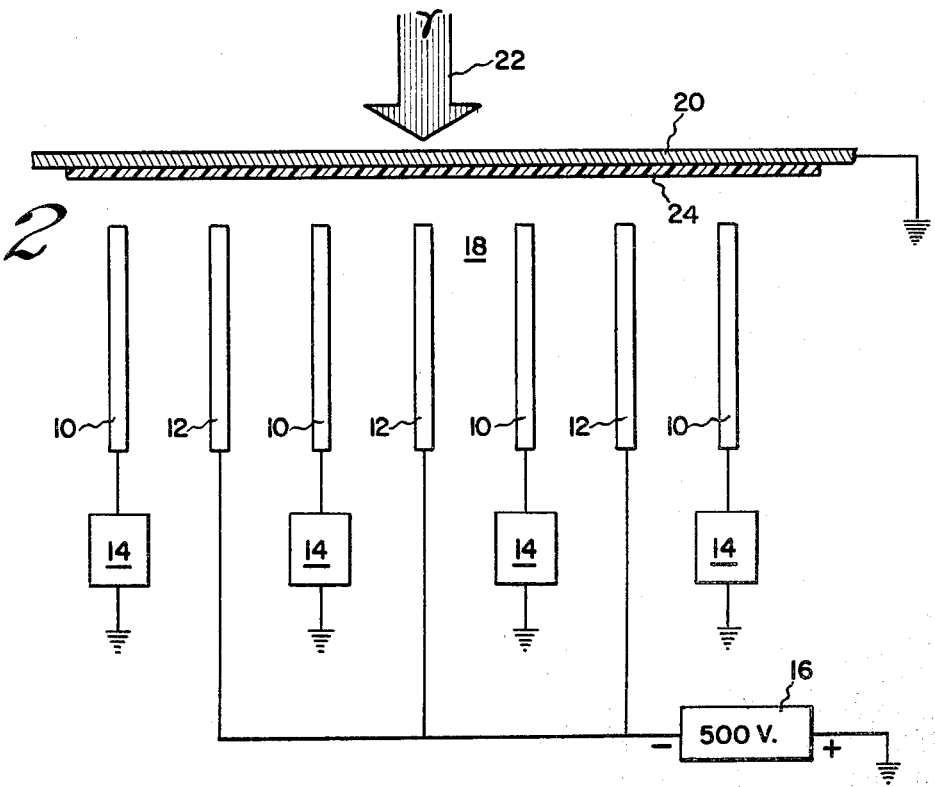
FIG. 2 is an ion chamber array of the present invention which includes a dielectric layer on the inner surface of an enclosure window.

FIG. 2 is a detector of the present invention which, in addition to the elements illustrated in FIG. 1, comprises a thin dielectric layer 24 disposed on the inner surface of the window 20 adjacent the collector plates 10 and 12. The dielectric layer 24 may comprise any material normally used for that purpose in the X-ray detector arts and may, for example, comprise Mylar ®, polycarbonate sheet approximately 0.12 millimeters thick. Electrons which are produced by interactions in the region between the window 20 and the collector plates 10 and 12 tend to drift along the electric field lines to the dielectric layer 24 on the surface of the grounded window 20 where they collect to charge the layer and produce a negative electric potential which acts to modify the electric field and drive further electrons back to the anode plates 10.

Figure 3:
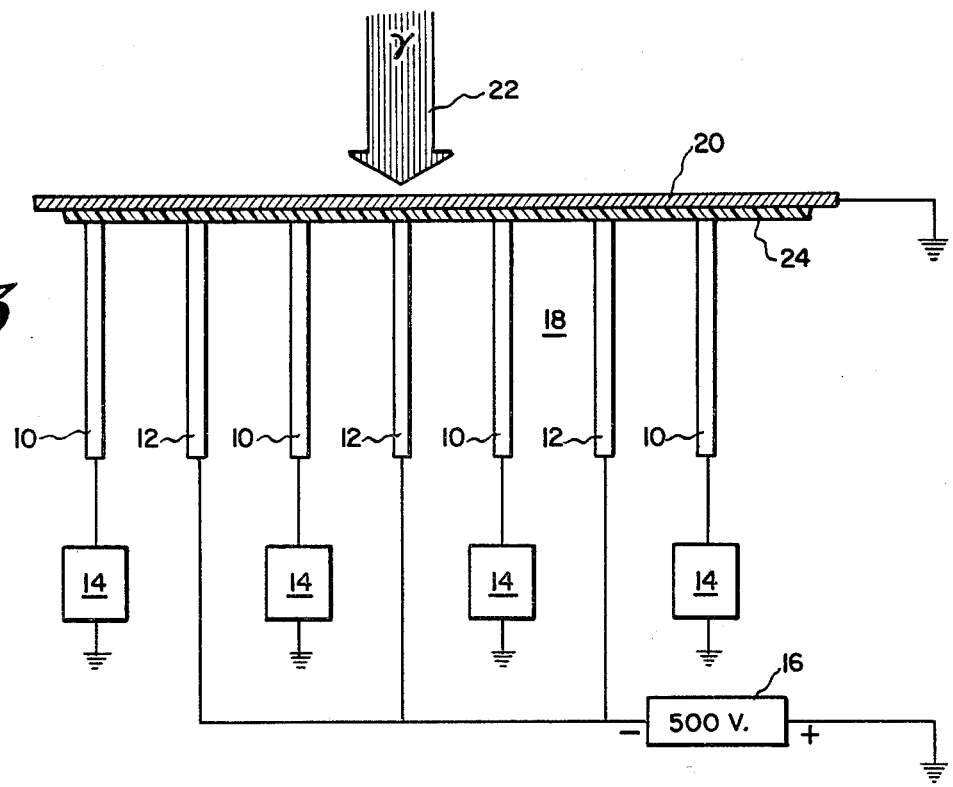
FIG. 3 is an alternate embodiment of the detector array of FIG. 2 wherein the collection electrodes are disposed in contact with the dielectric layer.

FIG. 3 is an alternate embodiment of the detector of FIG. 2. A thin dielectric layer 24 is, as in the embodiment of FIG. 2, disposed on the inner surface of the conductive window 20. The anode plates 10 and the cathode plates 12 in this embodiment are disposed in contact with the dielectric layer 24 thereby eliminating the dead space between the plates and the window.

Figure 4:
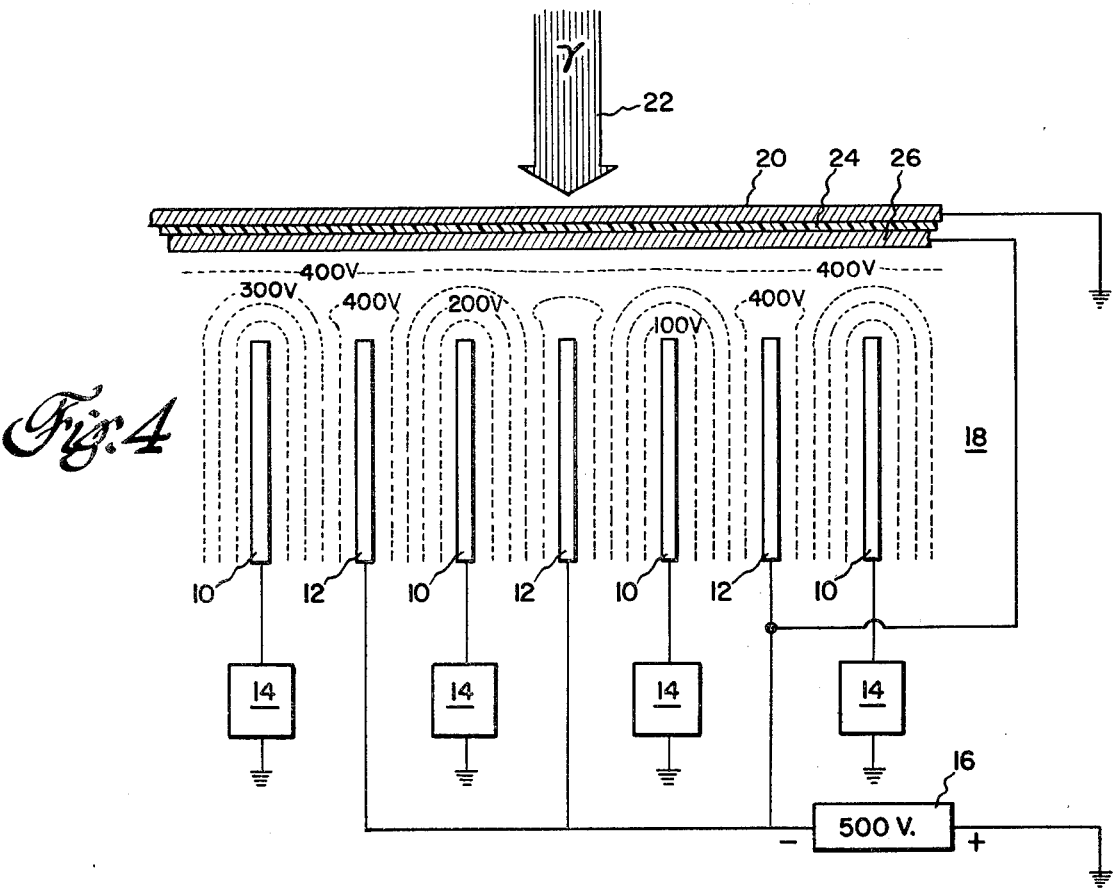
FIG. 4 is a preferred embodiment of the detector of FIG. 2 which further comprises a conductive electrode disposed on the inner surface of the dielectric layer.

FIG. 4 is a preferred embodiment of a detector of the present invention. The anode plates 10 and the cathode plates 12 are disposed, in a manner described with reference to the prior art of FIG. 1, in a high pressure detector gas 18. The anodes 10 are grounded through current detecting circuits 14 while the cathodes 12 are maintained at a negative voltage by a power supply 16 having a grounded positive terminal. X-rays 22 enter the detector through a thin conductive window 20 in a direction substantially parallel to the anodes 10 and cathodes 12. The window 20 forms a portion of the pressure containment vessel and is maintained at ground potential. A thin dielectric layer 24 which may, for example, comprise 0.12 millimeter thick Mylar ®, polycarbonate plastic, is disposed on the inner surface of the window 20. A thin conductive electrode 26 which may, for example, comprise a 0.05 millimeter thick sheet of aluminum is disposed on the surface of the dielectric 24 opposite the window 20. Alternately, the electrode 26 may comprise an aluminum or other metallized layer deposited on the surface of the dielectric sheet by vacuum evaporation or other well-known means.

The electrode 26 is connected to and maintained at cathode potential by the power supply 16. The electric field thus produced in the "dead space" between the window electrode 26 and the collection electrodes 10 and 12 is illustrated by the equipotential contours of FIG. 4. The electric field in this region is directed toward the anodes 10 so that electrons produced in that region tend to flow to the anodes where they are collected and measured by the current detector circuits 14.

Although the embodiment of FIG. 4 is necessarily more complex than that of FIGS. 2 and 3, comprising an additional electrode 26 and connections to the cathode power supply, it provides a far more stable electric field configuration and is less susceptible to errors which might be caused by charge draining from the dielectric layer 24. This electrical leakage to ground in the embodiment of FIG. 2 might make it necessary to re-establish the potentials before each measurement by applying a few X-ray pulses to the collector. Current leakage through the dielectric layer 24 of FIG. 3 might, likewise, cause unwanted leakage currents which would add to the current measured by the detecting circuits 14.

The detectors of the present invention have significantly increased quantum efficiency and lowered noise levels than the detectors of the prior art. It has been calculated that the increased active detector area provided by the structures of the present invention will reduce the X-ray dose to a patient undergoing examination by from 9.1 to 13.2 percent for X-rays in the 120 kVp to 80 kVp range.

The present structure also permits the construction of detectors with increased spacing between the collection electrodes and the window assembly. This increase in permissible spacing allows a relaxation of the manufacturing tolerances and tends to lower detector cost.

While the invention has been described in detail herein in accord with certain preferred embodiments thereof, many modifications and changes may be affected by those skilled in the art. Accordingly, it is intended by the appended claims to cover all such modifications and changes as fall within the true spirit and scope of the invention.

The invention claimed is:

1. An X-ray permeable structure for admitting X-rays into an ionization chamber X-ray detector array, comprising:

a first sheet of electrically conductive material;

a thin continuous layer of dielectric material having a major surface disposed on an inner major surface of said first sheet;

a second continuous sheet of conductive material having a major surface disposed on the major surface of said dielectric sheet opposite said first sheet of conductive material; and means for maintaining said second sheet of conductive material at or near the potential of one or more cathode structures, whereby electrons produced by X-ray interactions in a region between said second sheet of conductive material and said cathode structure are caused to flow to one or more adjacent anode structures for collection and measurement.

2. The X-ray permeable structure of claim 1 wherein said dielectric layer comprises polycarbonate plastic.

3. The X-ray permeable structure of claim 1 wherein said first sheet of electrically conductive material comprises aluminum and said dielectric layer comprises polycarbonate plastic.

4. The X-ray permeable structure of claim 1 wherein said second sheet of conductive material comprises a metallized layer deposited on the surface of said dielectric layer.

5. The X-ray permeable structure of claim 3 wherein said second sheet of conductive material comprises a metallized layer deposited on the surface of said dielectric layer.

6. In X-ray detection apparatus of the type comprising a plurality of substantially planar, parallel anodes and cathodes disposed in an ionizable detecting medium, voltage supply means coupled to said anodes and cathodes for maintaining said anodes positive with respect to said cathodes and including electric current flow measuring means coupled to said anodes, and vessel means enclosing said anodes, cathodes and detecting medium, said vessel means including a thin window substantially transparent to X-ray radiation and oriented substantially perpendicular to said anodes and cathodes, said window being maintained positive with respect to said cathodes, the improvement wherein electric field distribution in said medium between said window and said parallel anodes and cathodes is configured to permit collection on said anodes of electrons and ions produced by interactions between X-ray photons and said medium, said improvement comprising:
   a thin layer of dielectric material having a major surface disposed on an inner major surface of said window;
   a thin electrode having a major surface disposed on the major surface of said dielectric layer opposite said window; and
   means coupled to said thin electrode for maintaining said electrode substantially at the potential of said cathodes such that electrons in said medium between said electrode and said parallel anodes and cathodes tend to flow to said anodes.

7. The apparatus of claim 6 wherein said means coupled to said thin electrode comprises conductive means electrically interconnecting said cathodes and said electrode.

8. In an X-ray detector of the type comprising a plurality of substantially planar, parallel anodes and cathodes disposed in an ionizable detecting medium, means adapted to apply an electric field between said cathodes and said anodes so that said anodes can be maintained positive with respect to said cathodes, and vessel means enclosing said anodes, cathodes and detecting medium, said vessel means including a thin window substantially transparent to X-ray radiation and oriented perpendicular to said anodes and said cathodes, said window adapted to be maintained positive with respect to said cathodes, the improvement wherein electric field distribution in said medium between said window and said parallel anodes and cathodes is adapted to be configured to permit collection on said anodes of electrons and ions produced by interactions between X-ray photons and said medium, said improvement comprising:
   a thin layer of dielectric material having a major surface disposed on an inner major surface of said window; and
   a thin electrode having a major surface disposed on the major surface of said dielectric layer opposite said window, said electrode being adapted to be maintained substantially at the potential of said cathodes such that electrons in said medium between said electrode and said parallel anodes and cathodes tend to flow to said anodes, and said anodes being adapted to be connected to electric current measuring means.

9. The apparatus of claim 8 including conductive means electrically interconnecting said cathodes and said electrode.

* * * * *